Dec. 27, 1960   J. A. DOMBROWSKI   2,966,604
ELECTROLUMINESCENT LAMP
Filed Dec. 31, 1953
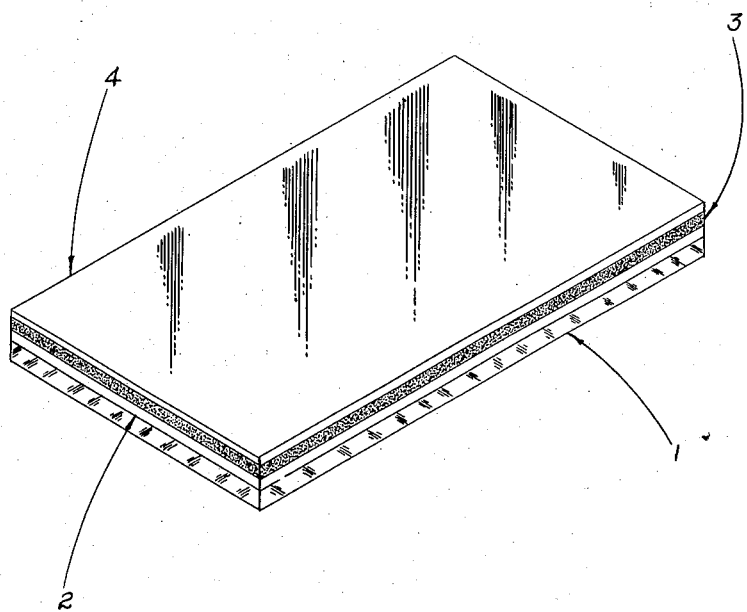
INVENTOR.
JOSEPH A. DOMBROWSKI
BY
ATTORNEY

United States Patent Office 2,966,604
Patented Dec. 27, 1960

2,966,604

ELECTROLUMINESCENT LAMP

Joseph A. Dombrowski, Salem, Mass., assignor, by mesne assignments, to Sylvania Electric Products Inc., Wilmington, Del., a corporation of Delaware Filed Dec. 31, 1953, Ser. No. 401,523

8 Claims. (Cl. 313—108)

This invention relates to electroluminescent lamps and more particularly to the construction thereof.

In an electroluminescent lamp, light is obtained by the direct application of voltage across a phosphor or by placing the phosphor in an electric field. In many cases the phosphor is embedded in a dielectric medium and placed between two conductors across which a voltage may be applied. One of these conductors is usually a layer of electrically-conductive material disposed on a glass or other ceramic sheet or on top of the phosphor-dielectric layer.

One of the problems encountered in the manufacture of electroluminescent lamps using a ceramic frit as a dielectric medium in which the phosphor is embedded has been dielectric strength. Manifestations of this problem are superificial sparking, i.e., small flashes where it appears only a very small area has burned, and continuous burning of both the layer of electrically-conductive material and the phosphor-dielectric layer. Since dielectric strength is a direct function of the thickness of the dielectric layer and since the brightness of the lamp is inversely proportional to the thickness of the dielectric layer, it is readily apparent that a severe limitation is thereby placed on both brightness and allowable over-voltage.

Heretofore it had been felt that in order to obtain good brightness, the layer of electrically-conductive material should be characterized by low resistivity, about 500–1000 ohms per sq., for example. However, I have found that if this layer of electrically-conductive material is characterized by high resistivity, the dielectric strength of the lamp is increased without adversely affecting the brightness.

In a specific embodiment of the invention shown in the drawing, glass plate 1 is provided with a layer 2 of transparent electrically-conductive material. Various methods known in the art may be employed to provide the plate 1 with the layer 2. For example, the plate 1 may be sprayed while hot with a solution consisting substantially of a metallic compound, for example chlorides, or less commonly oxides, sulphates or organic complexes. Alternatively, the glass plate may be heated and exposed while hot to vapors of the chlorides of metals such as tin, antimony or indium, and afterwards placing the treated glass plate in a slightly reducing atmosphere. When the application in the vapor state or by spraying is not convenient, good results can be obtained by mixing stannic chloride with absolute alcohol and glacial acetic acid and dipping the heated glass into the boiling mixture.

A layer 3 of an electroluminescent phosphor embedded in a ceramic frit is fused onto the layer 2 of transparent electrically-conductive material. A ceramic frit-phosphor layer prepared and applied as taught in the copending application of Rulon, Serial No. 365,617, now abandoned, may be employed.

The phosphor is in the form of a powder of fine particles of activated zinc sulfide for example, such as that shown and described in the copending application of Butler, Serial No. 230,711, filed June 8, 1951, now Patent No. 2,772,242. Zinc silicate, copper-activated, and preferably containing a small amount of lead, and calcium silicate, activated with manganese and lead may also be used.

The ceramic frit is selected for its capability of fusing or sintering at a temperature below that which would destroy the phosphor during the fusion process. It is preferably free of any appreciable quantities of easily-reducible metallic compounds which would give an undesirable metallic deposit. Lead should not be present in the ceramic in any substantial amount in a form which can react with the phosphors to form a black, light-absorbing layer such as lead sulfide. Easily reduced materials which will increase the conductivity should also be avoided in the ceramic for best results.

Although any of the ceramic compositions described in the copending application of Rulon, Serial No. 365,617, now abandoned, may be employed, I have found the following composition suitable: glass comprising about 3.9% CaO, 4.8% BaO, 27.2% ZnO, 21.8% $SiO_2$, 26.8% $B_2O_3$, 8.8% $Na_2O$, 0.7% PbO, and 5.8% $R_2O_3$, the percentages being taken by weight. In the last compound, R has been used as a generic term to include one or more metals whose oxides can exist in this empirical form.

A suspension suitable for spraying is prepared by ball-milling a mixture of 100 parts of ceramic frit (powdered to 200 mesh) and 40 parts of electroluminescent phosphor in isopropyl alcohol with a small amount of water present, about 10% by volume. About 10 to 30 grams/sq. ft. (dry weight) of this ceramic-phosphor mixture is sprayed onto the layer 2 of transparent electrically-conductive material. After spraying, the layer 3 is air-dried for about 10 minutes at room temperature and for about 10 to 15 minutes at 150° C.

The glass plate 1, with the layers 2 and 3 thereon, is then placed on a flat ceramic support with the ceramic-phosphor layer 3 uppermost, and heated in an oven at about 780° C. for about 2 to 3 minutes to effect fusion thereof to the layer 2 on the plate 1. The ceramic support is then removed from the oven and placed in a spray hood where the ceramic-phosphor layer 3 is sprayed with a solution of stannic chloride to form layer 4. This spraying is done while the ceramic-phosphor layer 3 is still hot, i.e., within 10 or 15 seconds after removal from the oven. This solution is preferably a dilute one in order to facilitate its application and obtain a fairly uniform layer of high resistivity. One example of a solution which has been found to give satisfactory results comprises about 20 cc. of a solution comprising 90 grams of stannic chloride, 100 ml. of methyl alcohol and 40 ml. of formaldehyde solution (40% N), diluted in about 400 cc. of methyl alcohol. The data set forth in the table below indicate the increase in dielectric strength which is obtained without adversely affecting the brightness when the layer 4 is characterized by high resistivity.

| Lamp No. | Resistivity of layer 4, ohms/sq. | Brightness, ft. 1. | Dielectric Strength | | |
|---|---|---|---|---|---|
| | | | Spark Voltage | Unstable Voltage | Breakdown Voltage |
| 1 | 650 | .052 | 0–20 | 225 | 250 |
| 2 | 750 | .05 | 0–30 | 250 | 300 |
| 3 | 800 | .05 | 0–40 | 275 | 350 |
| 4 | 5,500 | .10 | 0–120 | 300 | 400 |
| 5 | 70,000 | .13 | 250 | 600 | 650 |
| 6 | 100,000 | .15 | 300 | 600 | 700 |
| 7 | 270,000 | .10 | 300 | 650 | 750 |
| 8 | 300,000 | .09 | 300 | 750 | 850 |

In the above table, the values in ohms per square of the resistivity of layer 4 are of the average of several measurements taken at various points on each layer 4. In lamp 5, for example, a resistance of about 50,000 ohms was noted at one point, whereas in lamp 8, a resistance of about 500,000 ohms was noted at one point. The brightness in footlamberts is the value obtained in each case operating the lamps at 120 volts and 60 cycles. In the case of lamps 1, 2, 3 and 4, the spark voltage is the range of voltages within which transitory superficial sparking at various points over the face of the lamp occurs; whereas in the case of lamps 5, 6, 7 and 8 the spark voltage is the lowest voltage at which this phenomena first occurs. The unstable voltage is that voltage at which continuous sparking at various points over the face of the lamp occurs. Breakdown voltage is that voltage at which continuous burning of the ceramic-phosphor layer as well as the layers of transparent electrically-conductive material develops.

Although, in the specific embodiment of my invention shown in the accompanying drawing and described above, the electroluminescent lamp comprises a glass plate, a layer of transparent electrically-conductive material, a ceramic-phosphor layer, and a layer of transparent electrically-conductive material, the use of a layer of electrically-conductive material having high resistivity as taught by my invention may be employed with electroluminescent lamps of other constructions. For example, a metal plate may be used instead of a glass plate with a conductive coating thereon, in which case the ceramic-phosphor layer would be fused directly to the metal plate; or a ceramic layer may be disposed between an electrode and the ceramic-phosphor layer.

Although they have not been shown in the drawing for clarity of illustration, it is to be understood of course that the two conductors between which the ceramic-phosphor layer is disposed are provided with suitable contacts for establishing connections therefrom to a source of electrical energy, as shown in the copending application of Rulon, Serial No. 365,617, now abandoned, for example.

What I claim is:

1. An electroluminescent lamp comprising: a pair of spaced conductors, at least one of which has a resistance of between about 50,000 to about 500,000 ohms per square; and an electroluminescent phosphor disposed therebetween.

2. An electroluminescent lamp comprising: a pair of spaced conductors, at least one of which has a resistance of between about 50,000 to about 500,000 ohms per square; and an electroluminescent phosphor embedded in a dielectric medium disposed therebetween.

3. An electroluminescent lamp comprising: a pair of spaced conductors, at least one of which has a resistance of between about 50,000 to about 500,000 ohms per square; and an electroluminescent phosphor embedded in a ceramic disposed therebetween.

4. An electroluminescent lamp comprising: a pair of spaced conductors, at least one of which has a resistance of about 100,000 ohms per square; and an electroluminescent phosphor embedded in a certmaic disposed therebetween.

5. An electroluminescent lamp comprising: a plate of light-transmitting material; a layer of light-transmitting electrically conductive material disposed on a face of said plate; a layer of electroluminescent phosphor embedded in a dielectric medium disposed on said layer of light-transmitting, electrically conductive material; and a layer of electrically conductive material having a resistance of between about 50,000 to about 500,000 ohms per square disposed on said layer of electroluminescent phosphor embedded in a dielectric medium.

6. An electroluminescent lamp comprising: a plate of light-transmitting material; a layer of light-transmitting electrically conductive material disposed on a face of said plate; a layer of electroluminescent phosphor embedded in a dielectric medium disposed on said layer of light-transmitting, electrically conductive material; and a layer of electrically-conductive material having a resistance of about 100,000 ohms per square disposed on said layer of electroluminescent phosphor embedded in a dielectric medium.

7. An electroluminescent lamp comprising: a plate of light-transmitting material; a layer of light-transmitting, electrically conductive material disposed on a face of said plate; a layer of electroluminescent phosphor embedded in a ceramic disposed on said layer of light-transmitting, electrically conducting material; and a layer of electrically conductive material having a resistance of between about 50,000 to about 500,000 ohms per square disposed on said layer of electroluminescent phosphor embedded in a ceramic.

8. An electroluminescent lamp comprising: a plate of light-transmitting material; a layer of light-transmitting, electrically conductive material disposed on a face of said plate; a layer of electroluminescent phosphor embedded in a ceramic disposed on said layer of light-transmitting electrically conducting material; and a layer of electrically conductive material having a resistance of about 100,000 ohms per square disposed on said layer of electroluminescent phosphor embedded in a ceramic.

References Cited in the file of this patent

UNITED STATES PATENTS

| 2,564,706 | Mochel | Aug. 21, 1951 |
| 2,566,349 | Mager | Sept. 4, 1951 |

OTHER REFERENCES

G. Destriau: "New Phenomenon of Electrophotoluminescence," Philosophical Magazine, October, 1947; vol. 38, pages 700, 701, 702, 711 to 713 and 723.